Nov. 29, 1949     A. F. WOOD     2,489,993
OFFSET RESISTANCE WELDING ELECTRODE WITH COOLANT TUBE
Filed Nov. 25, 1947
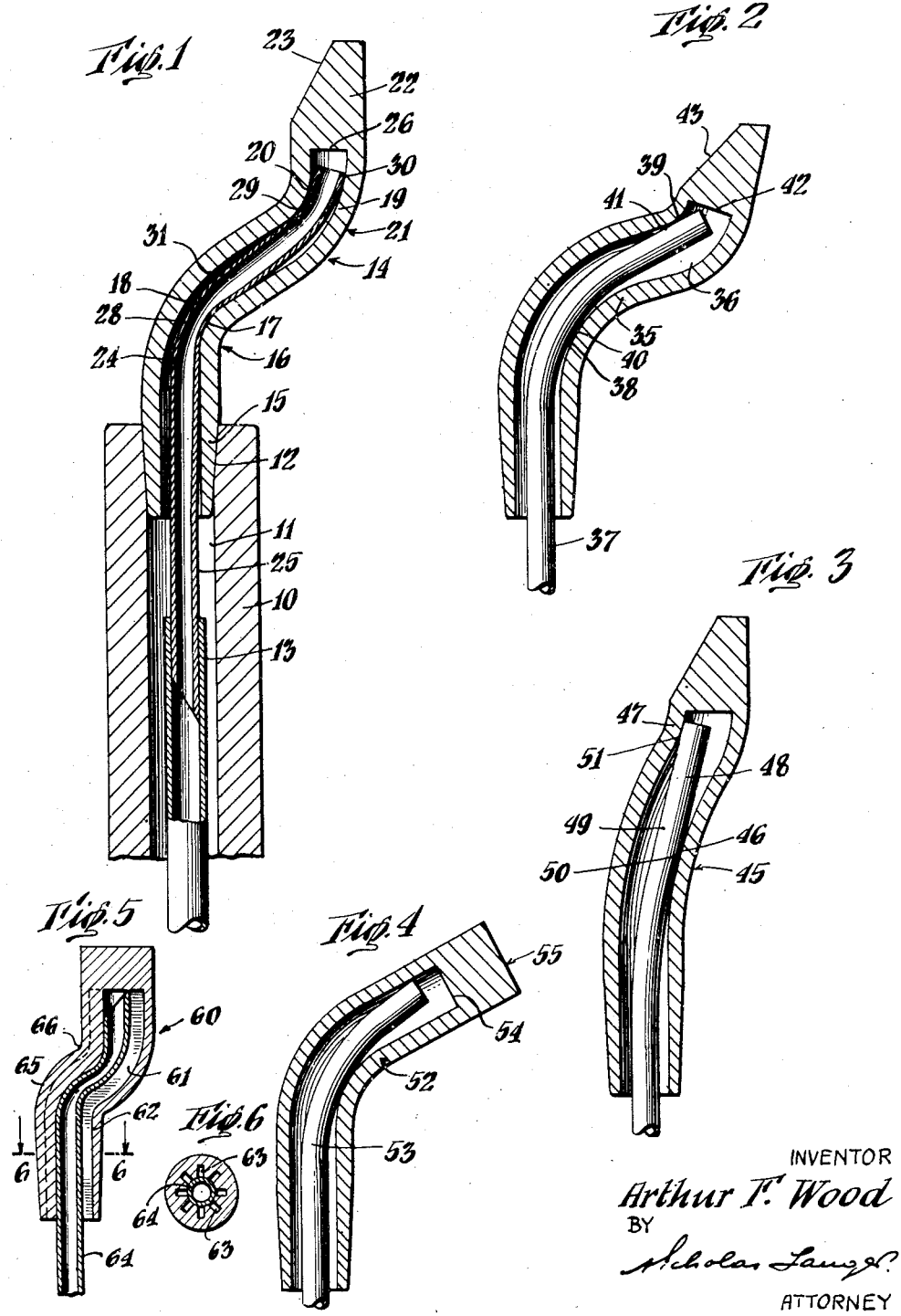
INVENTOR
Arthur F. Wood
BY
ATTORNEY Patented Nov. 29, 1949

2,489,993

UNITED STATES PATENT OFFICE 2,489,993

OFFSET RESISTANCE WELDING ELECTRODE WITH COOLANT TUBE

Arthur F. Wood, Indianapolis, Ind., assignor to P. R. Mallory & Co., Inc., Indianapolis, Ind., a corporation of Delaware Application November 25, 1947, Serial No 787,898

12 Claims. (Cl. 219—4)

This invention relates to offset welding electrode tips and to a method for making the same.

Heretofore, offset welding electrode tips have been relatively inefficient when utilized for resistance welding due to inadequate cooling which causes overheating of the tip and rapid deformation thereof in actual use. Such tips are ordinarily constructed to fit into a socket formed in a welding electrode holder and, where a straight tip is used, a cooling fluid conduit positioned within an axial passage in the holder extends into a bore formed in the tip to discharge cooling fluid against an area of the tip adjacent the welding face. However, when a curved or offset tip was utilized, it was the previous practice to terminate the cooling fluid conduit at the beginning of the curved portion of the tip. This left the coolant a considerable distance from the welding face resulting in inefficient cooling and resultant overheating and loss of tip life.

In accordance with the present invention, a welding tip is provided of the offset type which has a curved cooling fluid conduit inserted therein during the manufacturing operations. The end of the conduit is positioned very close to the welding face and provides an efficient discharge of cooling fluid to maintain a relatively low temperature at the welding face. This result is effected by inserting a cooling fluid conduit into the tip before it is bent and thereafter bending the tip and thereby the included conduit to form an offset tip. This bending forms curved sections in the conduit which engage the curved portions of the tip to positively retain the parts in assembled position. Accordingly, the welding face receives adequate cooling and the disadvantages of the previous offset tips are substantially overcome.

It is an object of the invention to improve the construction and method of making offset type welding tips.

It is a further object of the invention to provide an offset welding tip with improved life, having an integral cooling fluid conduit extending to a point adjacent the welding face.

It is a still further object of the invention to disclose an improved method for making such a tip.

Other objects of the invention will be apparent from the following description and accompanying drawings taken in connection with the appended claims.

For a fuller understanding of the nature and objects of the invention as well as for specific fulfillment thereof, reference should be had to the following detailed description taken in connection with the accompanying drawings, in which:

Figure 1 is a sectional view illustrating the novel offset tip mounted in a welding electrode holder;

Figures 2, 3, 4 and 5 are sectional views, partially in elevation, of modified types of welding tips; and Figure 6 is a sectional view taken along the line 6—6 of Figure 5.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in this application to similar parts as the art will permit.

Referring now to the drawings in detail, I have shown in Figure 1 a welding electrode holder 10 having an axial bore 11 extending therethrough which terminates in a socket portion 12. A cooling fluid conduit 13 is mounted in the bore 11 and terminates a small distance short of the socket 12. An offset welding tip 14 has a substantially straight shank portion 15 which is fitted in the socket 12 and the tip further includes a curved portion 16 having a wall section 17 of relatively small radius and a wall section 18 of relatively large radius. The tip further includes a reversely curved portion 19 which likewise has a wall section 20 of relatively small radius and a wall section 21 of relatively large radius. The reversely curved portion 21 merges into a nose portion 22 including a welding face 23, of any desired contour.

A central passage 24 is formed in the welding tip and this passage extends through the straight shank portion 15, the curved portion 16, and the reversely curved portion 21 into the nose portion 22. Suitably secured to the conduit 13 is a conduit or extension 25 which forms a part of the welding tip and which is adapted to discharge cooling fluid against an area 26 of the tip adjacent the welding face 23. The conduit 25 thus extends through the passage 24 and it will be noted that said conduit has a curved section 28 which engages the curved portion 16 at the wall 17 of reduced radius. Similarly, at the reversely curved portion 21, the conduit has a curved section 29 which engages the wall 20 of reduced radius. In the example shown, the conduit may also engage the tip at a point 30 adjacent the area 26.

It will be apparent that the cooling fluid flowing through conduits 13 and 25 is discharged against the area 26 which is relatively close to the welding face 23 and that the fluid thereafter returns through the interspace 31 between the outer surface of the conduit and the periphery of the passage 24. The curved sections of the conduit which engage the tip positively retain the conduit within the tip and hold it firmly in position during operation of the welding electrode. As stated, the distinguishing feature of the described structure is the fact that the cooling fluid is discharged against an area close to the welding face despite the curvature imparted to the tip 14.

In making the described welding electrode, an axial bore is formed in a straight welding electrode tip, or a completely finished straight type electrode having a bore, taper and nose form may be used without subsequent operations after bending the electrode. Thereupon, a length of cooling fluid conduit is inserted into the bore and the tip is then bent to form an offset welding electrode of desired configuration. In bending the tip, the conduit is correspondingly bent and curved sections are formed therein which engage the bent portions of the tip at the wall sections of smaller radius thereby retaining the conduit in assembled relation within the tip.

It will be apparent that the described method may be applied to a variety of welding tips of various sizes and offset configurations. Thus, in Figure 2, an offset welding tip 35 is provided with an interior passage 36 and conduit 37 which has curved sections 38 and 39 engaging the respective bent portions of the tip at 40 and 41. In the modification of Figure 2, however, the conduit does not engage the tip adjacent the cooled area 42, as shown at 30 in Figure 1. Nevertheless, the cooling fluid conduit is positively retained in assembled position within the tip by engagement of the conduit and tip at 40 and 41, and the cooling fluid discharged against the area 42 efficiently cools the welding face 43.

In Figure 3, a welding tip 45 is shown having bent portions 46 and 47. However, the curvature of these bends is relatively small and the inserted conduit 48 may be withdrawn from the tip if desired, before it is inserted into the electrode holder. In this modification, the inserted cooling fluid conduit 48 engages the bent portion 46 at 50 and the bent portion 47 at 51. This structure also provides for efficient delivery of the cooling fluid to an area of the tip which is adjacent the welding face.

In Figure 4, a welding tip 52 is shown having a single bent portion, and having a coolant tube 53 bent and retained as an integral part of the welding tip. In this modification, the fluid conduit 53 carries coolant to discharge against surface 54, thus efficiently cooling the tip welding face 55.

The principles of this invention may be applied very advantageously to fluted welding electrodes, as shown in Figures 5 and 6. The construction and advantages of such electrodes are pointed out in detail by the copending application of Hensel, Larsen and Holt, Serial No. 752,144, entitled "Method of making fluted spot welding electrodes and products thereof." In Figures 5 and 6, a welding electrode 60 has splines or flutes 61 formed upon the inner surface of the coolant hole 62, these splines defining a series of circumferentially arranged recesses or passages 63. In accordance with the invention, a cooling fluid conduit 64 is inserted into a fluted electrode of straight configuration which is thereafter bent to form curved portions, as at 65 and 66, thereby forming an offset tip. This bending, of course, forms corresponding curved portions in the conduit 64, as shown in Figure 5. This fluted structure improves the efficiency of heat exchange between the electrode and coolant fluid in that the flutes increase the area of the internal water cooling passage. Further, the passages 63 provide completely unobstructed openings for the return flow of coolant fluid which are spaced about the whole circumference of the conduit 64, the flutes 61 preventing the conduit from closing any of said passages. The flutes 61 also hold the conduit rigidly in a central position within the tip and afford great rigidity and resistance to deformation during operation of the electrode.

While the present invention, as to its objects and advantages has been described herein as carried out in specific embodiments thereof, it is not desired to be limited thereby but it is intended to cover the invention broadly within the spirit and scope of the appended claims.

What is claimed as new and desired to be secured by Letters Patent is:

1. In combination, an offset welding electrode tip comprising a straight portion adapted to be seated in the socket of a welding electrode holder, a curved portion, and a nose portion including a welding face, said tip having a bore formed therein which extends through said straight portion and said curved portion into said nose portion, and a cooling fluid conduit mounted in said bore, said conduit contiguous with and extending through the curved portion of the tip and into the nose portion.

2. In combination, an offset welding electrode tip comprising a straight portion adapted to be seated in the socket of a welding electrode holder, a curved portion, and a nose portion including a welding face, said tip having a bore formed therein which extends through said straight portion and said curved portion into said nose portion, and a cooling fluid conduit mounted in said bore, said conduit contiguous with and extending through the curved portion of the tip and into the nose portion whereby the conduit is positively retained within the tip and is adapted to discharge cooling fluid against an area of the tip adjacent the welding face.

3. In combination, an offset welding electrode tip comprising a straight portion adapted to be seated in the socket of a welding electrode holder, a curved portion, and a nose portion including a welding face, said tip having a bore formed therein which extends through said straight portion and said curved portion into said nose portion, and a cooling fluid conduit mounted in said bore, said conduit having a curved section engaging the curved portion of said tip whereby the conduit is positively retained within the tip, the end of said conduit extending into said nose portion and being adapted to discharge cooling fluid against an area of the tip adjacent the welding face.

4. In combination, an offset welding electrode tip comprising a straight portion adapted to be seated in the socket of a welding electrode holder, a curved portion, a reversely curved portion, and a nose portion including a welding face, said tip having a bore formed therein which extends through said straight portion and both of said curved portions into said nose portion, and a cooling fluid conduit mounted in said bore, said conduit contiguous with and extending through the curved portions of the tip and into the nose portion whereby the conduit is positively retained in the tip and is adapted to discharge cooling fluid against an area of the tip adjacent the welding face.

5. In combination, an offset welding electrode tip comprising a straight portion adapted to be seated in the socket of a welding electrode holder, a curved portion, a reversely curved portion, and a nose portion including a welding face, said tip having a bore formed therein which extends through said straight portion and both of said curved portions into said nose portion, and a cooling fluid conduit mounted in said bore, said conduit having a curved section engaging each of said curved portions and having an outlet which is adapted to discharge cooling fluid against an area of the tip adjacent the welding face, said curved sections positively retaining the conduit in fixed position within said bore.

6. In combination, an offset welding electrode tip comprising a straight portion adapted to be seated in the socket of a welding electrode holder, a curved portion and a reversely curved portion each having a wall section of relatively small radius and a wall section of relatively large radius, and a nose portion including a welding face, said tip having a bore extending from said straight portion to an area adjacent said welding face, and a cooling fluid conduit mounted in said bore, said conduit having a plurality of radial sections engaging the respective curved portions of said tip at the wall section of lesser radius whereby the conduit is positively retained in the tip, said conduit having a discharge opening positioned adjacent said welding face.

7. In combination, an offset welding electrode tip comprising a straight portion adapted to be seated in the socket of a welding electrode holder, a curved portion, and a nose portion including a welding face, said tip having a bore formed therein which extends through said straight portion and said curved portion into said nose portion, a series of flutes extending longitudinally of said bore and spaced circumferentially about the inner surface of said bore, and a cooling fluid conduit contiguous with and mounted in said bore and supported by the inner surfaces of said flutes, said conduit extending through the curved portion of the tip into the nose portion, the openings between said flutes providing unobstructed passages for the flow of cooling fluid.

8. In combination, an offset welding electrode tip comprising a straight portion adapted to be seated in the socket of a welding electrode holder, a curved portion, and a nose portion including a welding face, said tip having a bore formed therewithin extending through said straight portion and said curved portion into said nose portion, and a cooling fluid conduit mounted in said bore and having portions of its outer surface fixedly engaged by the surface of the bore in said curved portion so as to be retained thereby in a substantially inextricable manner.

9. In combination, an offset welding electrode tip comprising a straight portion adapted to be mounted in a socket of an associated welding electrode holder, a sinuated section connected to said straight portion, said sinuated section including a curved portion and a nose portion contained in an axial plane substantially parallel to said straight portion connected to said curved portion, and a coolant conduit generally coaxially fitted within and having portions of its outer surface held by the surface of the bore of said curved portion of said tip so as to be positively retained thereby.

10. A welding electrode comprising an end portion engageable with a holder, another end portion having a work face, a curved portion connecting said end portions, a blind bore passing through said portions having a curved section adjacent said first curved portion, said bore ending short of said face, and a coolant tube disposed within said bore having its surface conforming to the shape of said bore and constricted at two spaced regions thereof, said regions being staggered with respect to each other.

11. A welding electrode comprising an end portion engageable with a holder, another end portion having a working face, and a curved portion intermediate to said end portions, a blind bore through said portions ending short of said face, and a curved coolant tube extending through said bore and generally conforming to the shape thereof, said tube having a diameter smaller than that of said bore and having its outer surface substantially conforming to and in engagement with the surface of the bore in two spaced regions at opposite sides of the tube.

12. A welding electrode comprising an end portion engageable with a holder, another end portion having a work face, a curved portion connecting said end portions, a blind bore passing through said portions having a curved section adjacent said first curved portion, said bore ending short of said face, and a coolant tube disposed within said bore and generally conforming to its shape, said tube being constricted and having a surface engaging a surface of said bore in two spaced regions at opposite sides of said tube and staggered with respect to each other.

ARTHUR F. WOOD.

REFERENCES CITED

The following references are of record in the file of this patent:

UNITED STATES PATENTS

| Number | Name | Date |
|---|---|---|
| 1,735,563 | Deckard | Nov. 12, 1929 |
| 2,000,680 | Weatherhead | May 7, 1935 |
| 2,088,936 | Von Henke | Aug. 3, 1937 |
| 2,374,979 | Carlson et al. | May 1, 1945 |
| 2,446,932 | Johnson | Aug. 10, 1948 |

FOREIGN PATENTS

| Number | Country | Date |
|---|---|---|
| 15,555 | Great Britain | Sept. 24, 1898 |